United States Patent
Loo et al.

(10) Patent No.: US 11,845,893 B2
(45) Date of Patent: Dec. 19, 2023

(54) OIL RECOVERY METHOD USING AN EMULSION COMPOSITION

(71) Applicant: SEECHEM HORIZON SDN. BHD., Petaling Jaya (MY)

(72) Inventors: Wee Chen Loo, Kuala Lumpur (MY); Yok Peng Chan, Shah Alam (MY)

(73) Assignee: Seechem Horizon Sdn. Bhd., Petaling Jaya (MY)

( * ) Notice: Subject to any disclaimer, the term of this patent is extended or adjusted under 35 U.S.C. 154(b) by 94 days.

(21) Appl. No.: 17/601,073

(22) PCT Filed: Sep. 17, 2019

(86) PCT No.: PCT/MY2019/050058
§ 371 (c)(1),
(2) Date: Oct. 3, 2021

(87) PCT Pub. No.: WO2020/204689
PCT Pub. Date: Oct. 8, 2020

(65) Prior Publication Data
US 2022/0204834 A1    Jun. 30, 2022

(30) Foreign Application Priority Data
Apr. 5, 2019 (MY) .......................... PI 2019001900

(51) Int. Cl.
*E21B 43/20* (2006.01)
*C09K 8/584* (2006.01)
*C09K 8/588* (2006.01)

(52) U.S. Cl.
CPC .............. *C09K 8/584* (2013.01); *C09K 8/588* (2013.01); *E21B 43/20* (2013.01)

(58) Field of Classification Search
CPC ................................ C09K 8/584; C09K 8/588
See application file for complete search history.

(56) References Cited

U.S. PATENT DOCUMENTS

| 8,357,639 | B2 | 1/2013 | Quintero et al. | |
| 2011/0071056 | A1* | 3/2011 | Saini ...................... | C09K 8/035 507/131 |
| 2012/0026112 | A1 | 10/2012 | Del Gaudio et al. | |
| 2016/0272874 | A1* | 9/2016 | Sharma ................... | E21B 43/16 |
| 2019/0256458 | A1* | 8/2019 | Hussain ................. | C07C 381/06 |

FOREIGN PATENT DOCUMENTS

| CN | 109233780 | 1/2019 |
| CN | 109423269 | 3/2019 |
| WO | 2019190304 | 10/2019 |

OTHER PUBLICATIONS

International Search Report dated Dec. 4, 2019.
Written Opinion of the International Searching Authority dated Dec. 4, 2019.
International Preliminary Report on Patentability dated Mar. 17, 2021.
English Abstract of CN109423269.
English Abstract of CN109233780.
Jeirani et al.,"Formulation, Optimization and Application of Triglyceride Microemulsion in Enhanced Oil Recovery," Industrial Crops and Products, 2013, pp. 6-14, vol. 43.
See et al., "Nanoemulsion for Non-Aqueous Mud Removal in Wellbore," SPE 149088, Paper Presented at the SPE/DGS Saudi Arabia Section Technical Symposium and Exhibition, Al-Khobar, Saudi Arabia May 15-18, 2011.
Nur et al., "Nanoemulsion Applications in Enhanced Oil Recovery and Wellbore Cleaning: An Overview," Applied Mechanics and Materials, 2015, pp. 1161-1168, vols. 754-755.
Nguele et al., "Physicochemical and Microemulsion Properties of Dimeric Quarternary Ammonium Salts With Trimethylene Spacer for Enhanced Oil Recovery," Colloid Polym Sci, 2015, pp. 3487-3497, vol. 293.
Liu et al., "Enhanced Oil Recovery Potential of Alkyl Alcohol Polyoxyethylene Ether Sulfonate Surfactants in High-Temperature and High-Salinity Reservoirs," Energy Fuels, 2018, pp. 12128-12140, vol. 32.
Yuan et al., "Effects of Interfacial Tension, Emulsification, and Surfactant Concentration on Oil Recovery in Surfactant Flooding Process for High Temperature and High Salinity Reservoirs," Energy Fuels, 2015, pp. 6165-6176, vol. 29.
Kamal, "A Review of Gemini Surfactants: Potential Application in Enhanced Oil Recovery," J. Surfact Deterg, 2016, pp. 233-236, vol. 19.
Liu et al., "Performance Study of a New Type Alkaline/Surfactant/Polymer Ternary Complex," SPE 145001, Paper Presented at Enhanced Oil Recovery Conference, Jul. 19-21, 2011, Kuala Lumpur, Malaysia.
Zhang et al., "Study of a Novel Gemini Viscoelastic Surfactant With High-Performance in Clean Fracturing Fluid Application," Polymers, 2018, pp. 1215/1-1215/18, vol. 10(11).

* cited by examiner

*Primary Examiner* — Silvana C Runyan
(74) *Attorney, Agent, or Firm* — Preston Smirman; SMIRMAN IP LAW, PLLC

(57) ABSTRACT

The present invention relates a method for treating oil well using an emulsion composition. More particularly, the method comprises a step of introducing an emulsion composition in an amount of 0.01% to 100% to pore volume of oil reservoir into the oil well, such that interfacial tension between the oil well and the reservoir reduces to $10^{-4}$ mM/m or below thereby enable removal of oil therefrom.

10 Claims, No Drawings

OIL RECOVERY METHOD USING AN EMULSION COMPOSITION

CROSS-REFERENCE TO RELATED APPLICATION

The instant application is a national phase of PCT International Application No. PCT/MY2019/050058 filed Sep. 17, 2019, and claims priority to Malaysian Patent Application Serial No. PI 2019001900 filed Apr. 5, 2019, the entire specifications of both of which are expressly incorporated herein by reference.

FIELD OF INVENTION

The present invention relates generally to oil and gas field, more particularly to a method for treating oil well using an emulsion composition, such as a microemulsion or a nanoemulsion.

BACKGROUND OF THE INVENTION

In the art of enhanced oil recovery from an oil well, chemicals such as alkaline-surfactant-polymer (ASP) or surfactant-polymer (SP) are commonly used. However, the aforementioned chemicals are generally not compatible with calcium and magnesium ions. Hence, continued use of such chemicals may result in formation of undesired scale deposits along well pipeline or pumping unit. Further, the chemicals are not entirely effective in seawater. High amount of salt in the seawater may affect performance of ASP or SP rendering them difficult to achieve an effective interfacial tension between oil reservoir and oil well. In view of the above, nanoemulsion is now used to avoid the abovementioned drawbacks.

There are certain patented technologies disclosing the use of emulsions in enhanced oil recovery. For example, United States Patent Publication No. U.S. Pat. No. 8,357,639 B2 disclosed a nanoemulsion suitable for use in the oil field. Nevertheless, application steps for using nanoemulsion are not disclosed. The present invention provides a method for using an emulsion in oil well remediation, also known to enhance oil recovery.

SUMMARY OF INVENTION

One aim of the present invention is to provide a method suitable for use in most kind of oil wells. More particularly, the method comprises steps of flushing the oil well with an emulsion composition, in which the emulsion used is compatible with seawater, hardwater, or the like. Hence, scale formation in the oil well can be avoided. Furthermore, the emulsion composition used is chemically stable, hence having low dependency on environmental changes, such as pH, ionic strength, type of rocks, and temperature.

Another aim of the present invention is to provide an environmental friendly method for enhancing oil recovery from oil wells. More particularly, the emulsion composition used is biodegradable.

Another aim of the present invention is to provide a flexible method for enhancing oil recovery from oil wells. In certain embodiments, the emulsion composition can work in association with water flooding method and/or polymer flooding method to achieve better well remediation.

Another aim of the present invention is to provide an effective method for enhancing oil recovery from oil wells. More particularly, the method increases flowability of the oil reservoir in the oil wells.

At least one of the preceding aspect is met, in whole or in part, by the present invention, in which one of the embodiments of the present invention is an enhanced oil recovery method from an oil well comprising a step of: introducing an emulsion composition having dispersed oil-in-water or water-in-oil droplet size of equal or less than 1 μm ($1\times10^{-6}$ meter) in an amount of 0.01% to 100% to pore volume of oil reservoir into the oil well, such that interfacial tension (IFT) between the oil well and the reservoir reduces to $10^{-4}$ mM/m or lower thereby enable removal of oil therefrom.

In one preferred embodiment, the method further comprises a step of pre-flushing the oil well with treated seawater in an amount of 0.01% to 10% to pore volume of the oil reservoir.

In certain embodiment, the method further comprises a step of introducing a polymeric solution into the oil well, in which the polymeric solution is in an amount of 0.15% to 100% to pore volume of oil reservoir into the oil well.

Preferably, the polymeric solution comprises water and polymer selected from any one or a combination of polyacylamine or derivatives thereof, xanthan gum, hydroxyethyl cellulose, carboxymethyl cellulose, and guar gum.

Advantageously, the polymer solution used has a polymer concentration of 0.05 w/w % to 2 w/w % in water.

In certain embodiment, the method further comprises a step of introducing the oil well with an aqueous solution in an amount of 0.15% to 200% to pore volume of the oil reservoir.

Preferably, the aqueous solution is any one or a combination of water, treated seawater, and brine.

In certain embodiment, the method further comprises a step of diluting the emulsion composition to a concentration of 0.1 w/w % to 20 w/w % in water, treated seawater or brines.

Advantageously, the emulsion composition comprises an aqueous phase in 0.5 to 60% by weight of total composition; an non-aqueous phase in 15 to 90% by weight of total composition; a surfactant in 2 to 60% by weight of total composition; and a compound having Chemical structure I in 1 to 30% by weight of total composition,

$$R_1-CONH-[R_2-NH-R_3]_n-HNOC-R_4 \text{ (Chemical structure I)}$$

in which $R_1$, $R_2$, $R_3$ and $R_4$ are linear, branched or aromatic carbon-containing substituents having 2 to 26 carbon atoms and n is an integer ranges from 1 to 100, wherein each of the substituents comprises an alkyl group, carbonyl group, a carboxylic group, an amine group, or an amide group.

Preferably, the emulsion composition further comprises a co-surfactant in 1% to 30% by weight of the total composition, in which co-surfactant comprises a short-chain surfactant, a short-chain non-ionic surfactant, an alcohol, an amide, and/or a mixture thereof.

Preferably, the aforementioned brine is selected from ammonium chloride, potassium chloride, sodium chloride, sodium formate, potassium chloride, potassium formate, sodium bromide, calcium chloride, calcium bromide and mixtures thereof.

DETAILED DESCRIPTION OF THE INVENTION

Exemplary, non-limiting embodiments of the invention will be disclosed. However, it is to be understood that limiting the description to the preferred embodiments of the invention is merely to facilitate discussion of the present invention and it is envisioned that those skilled in the art may devise various modifications without departing from the scope of the appended claim.

The term "emulsion" herein refers to microemulsion or nanoemulsion having dispersed oil-in-water or water-in-oil.

The present invention is an enhanced oil recovery method from an oil well comprising a step of: introducing an emulsion composition in an amount of 0.01% to 100% to pore volume of oil reservoir into the oil well, such that interfacial tension (IFT) between the oil well and the reservoir reduces to $10^{-4}$ mM/m or below thereby enable removal of oil therefrom. In one embodiment, the IFT can be reduced to $10^{-6}$ mN/m.

The step of introducing the emulsion composition can be conducted by injecting it into an oil well and flooding thereof, such that there is sufficient contact between the emulsion, the oil reservoir, and undesired deposits along the oil well. Advantageously, the composition to seep through rocks or cracks in the oil well as well. Upon sufficient contact, the emulsion adsorbs onto the reservoir surfaces and oil surfaces. It reduces the contact angle and facilitate the reduction in interfacial tension. It shall be noted that further introduction of water therein helps remove excess oils within the pores.

If necessary, the method comprises a step of pre-flushing the oil well with treated seawater. The seawater used is preferably treated to remove bacteria, fungus, and oxygen. Generally, the step of pre-flushing is conducted before the step of introducing the emulsion composition thereinto. More particularly, the oil well is pre-flushed with treated seawater in an amount of 0.01% to 10% to pore volume of the oil reservoir.

In accordance to preceding description, the step of introducing the emulsion composition into the oil well may work in association with aqueous solution and/or polymer flooding in different sequences. Aqueous solution flooding herein is also generally known as "water flooding" in the art. Particularly, aqueous solution flooding herein uses water, treated seawater, or brine. The brine used is selected from ammonium chloride, potassium chloride, sodium chloride, sodium formate, potassium chloride, potassium formate, sodium bromide, calcium chloride, calcium bromide and mixtures thereof. On the other hand, polymer flooding herein preferably uses biosynthesized and/or water-soluble polymer. More particularly, the polymeric solution comprises polymer selected from any one or a combination of polyacylamine or derivatives thereof, xanthan gum, hydroxyethyl cellulose, carboxymethyl cellulose, and guar gum.

In one embodiment, the method comprised of sequential steps: (1) pre-flushing the oil well with treated seawater in an amount of 0.01% to 10% to pore volume of the oil reservoir; (2) introducing a nanoemulsion composition in an amount of 0.01% to 50% to pore volume of oil reservoir into the oil well, such that interfacial tension (IFT) between the oil well and the reservoir reduces to $10^{-4}$ mM/m or below thereby enable removal of oil therefrom; and then (3) introducing the oil well with an aqueous solution in an amount of 0.15% to 100% to pore volume of the oil reservoir.

In another embodiment, the method comprised of sequential steps: (1) pre-flushing the oil well with treated seawater in an amount of 0.01% to 10% to pore volume of the oil reservoir; (2) introducing a nanoemulsion composition in an amount of 0.01% to 100% to pore volume of oil reservoir into the oil well, such that interfacial tension (IFT) between the oil well and the reservoir reduces to $10^{-4}$ mM/m or below thereby enable removal of oil therefrom; (3) introducing a polymeric solution into the oil well, in which the polymeric solution is in an amount of 0.15% to 100% to pore volume of oil reservoir into the oil well; and then (4) introducing the oil well with an aqueous solution in an amount of 0.15% to 100% to pore volume of the oil reservoir.

Alternatively, the method comprises an embodiment where the nanoemulsion and the polymer solution are mixed prior to introducing into the oil well. In this embodiment, the method comprised of sequential steps: (1) pre-flushing the oil well with treated seawater in an amount of 0.01% to 10% to pore volume of the oil reservoir; (2) introducing a mixture of nanoemulsion composition and polymer solution in an amount of 0.01% to 100% to pore volume of oil reservoir into the oil well, such that interfacial tension (IFT) between the oil well and the reservoir reduces to $10^{-4}$ mM/m or below thereby enable removal of oil therefrom; (3) introducing an extra dose of polymeric solution into the oil well, in which the polymeric solution is in an amount of 0.15% to 100% to pore volume of oil reservoir into the oil well; and then (4) introducing the oil well with an aqueous solution in an amount of 0.15% to 200% to pore volume of the oil reservoir.

More particularly, the emulsion composition used is preferably diluted with water, treated seawater, or brine to a predetermined concentration prior to use. The brine used is selected from ammonium chloride, potassium chloride, sodium chloride, sodium formate, potassium chloride, potassium formate, sodium bromide, calcium chloride, calcium bromide and mixtures thereof. The seawater used is preferably treated to remove bacteria, fungus, and oxygen. In the preferred embodiment, the method comprises a step of introducing a nanoemulsion composition having concentration of 0.1-20 w/w % in water into the oil well.

The emulsion composition used preferably comprises an aqueous phase in 0.5 to 60% by weight of total composition; an non-aqueous phase in 15 to 90% by weight of total composition; a surfactant in 2 to 60% by weight of total composition; and a compound having Chemical structure I in 1 to 30% by weight of total composition, $$R_1—CONH—[R_2—NH—R_3]_n—HNOC—R_4 \text{ (Chemical structure I)}$$

in which $R_1$, $R_2$, $R_3$ and $R_4$ are linear, branched or aromatic carbon-containing substituents having 2 to 26 carbon atoms and n is an integer ranges from 1 to 100, wherein each of the substituents comprises an alkyl group, carbonyl group, a carboxylic group, an amine group, or an amide group.

Optionally, the emulsion used may further comprised of 1-5 w/w % of biocides selected from glutaraldehyde, terakishydroxymethylphosphonium sulfate, n-alkyldimethyl-benzylammonium chloride and mixtures thereof.

Optionally, the emulsion used may also further comprised of 1-5 w/w % of chelating agents selected from amino trimethylene phosphonic acids, polyhydric alcohol phosphate esters, hexamethylenediaminetetra (methylenephosphonic acid) and mixtures thereof.

Optionally, the emulsion used may also further comprised of 1-5 w/w % of corrosion inhibitors selected from phosphate esters, amine salts of polycarboxylic acids, quaternary ammonium ammonium salts, quaternary iminium salts, amidoamines, imidazolines, ethoxylated fatty amines, ethoxylated fatty diamines and mixtures thereof.

Optionally, the emulsion used may also further comprised of 1-5 w/w % of pH buffers, if necessary.

The present invention may be embodied in other specific forms without departing from its essential characteristics.

The described embodiments are to be considered in all aspects only as illustrative and not restrictive. The scope of the invention is, therefore indicated by the appended claims rather than by the foregoing description. All changes, which come within the meaning and range of equivalency of the claims, are to be embraced within their scope.

The invention claimed is:

1. A method for oil recovery from an oil well, comprising the steps of:

introducing an emulsion composition having a dispersed oil-in-water or water-in-oil droplet size of equal to or less than 1 μm and is present in an amount ranging from 0.01 to 100% to a pore volume of an oil reservoir into the oil well;

wherein the emulsion composition comprises an aqueous phase present in a range of 0.5 to 40% by weight of the total composition, a non-aqueous phase present in a range of 15 to 90% by weight of the total emulsion composition, a surfactant present in a range of 2 to 60% by weight of total composition, and a compound having chemical structure I present in a range of 1 to 30% by weight of the total emulsion composition,

$R_1$—CONH—[$R_2$—NH—$R_3$]$_n$—HNOC—$R_4$ (Chemical Structure I)

in which $R_1$, $R_2$, $R_3$ and $R_4$ are linear, branched or aromatic carbon containing substituents having 2 to 26 carbon atoms and n is an integer in a range of 1 to 100, wherein each of the substituents is selected from the group consisting of an alkyl group, a carbonyl group, a carboxylic group, an amine group, an amide group and combinations thereof.

2. The method according to claim 1, wherein the emulsion composition further comprises a co-surfactant present in a range of 1% to 30% by weight of the total emulsion composition, in which the co-surfactant is selected from the group consisting of a short-chain surfactant, a short-chain non-ionic surfactant, an alcohol, an amide and combinations thereof.

3. The method according to claim 1, further comprising a step of pre-flushing the oil well with seawater in an amount in a range of 0.01 to 10% to the pore volume of the oil reservoir.

4. The method according to claim 3, further comprising a step of introducing a polymeric solution into the oil well after the step of introducing the emulsion composition, in which the polymeric solution is present in an amount ranging from 0.15 to 100% to the pore volume of the oil reservoir into the oil well.

5. The method according to claim 4, wherein the polymeric solution comprises water and the polymer is selected from the group consisting of polyacylamine or derivatives thereof, xanthan gum, hydroxyethyl cellulose, carboxymethyl cellulose, guar gum and combinations thereof.

6. The method according to claim 5, wherein the polymeric solution has a polymer concentration in a range of 0.01 to 2 w/w % in water.

7. The method according to claim 4, further comprising a step of introducing the oil well with an aqueous solution present in an amount ranging from 0.15% to 200% to the pore volume of the oil reservoir after the step of introducing the emulsion composition or the step of introducing the polymeric solution.

8. The method according to claim 7, wherein the aqueous solution is selected from the group consisting of water, treated seawater, brine and combinations thereof.

9. The method according to claim 7, further comprising a step of diluting the emulsion composition to a concentration in a range of 0.1-20 w/w % in water, treated seawater or brines before the step of introducing the emulsion composition into the oil well.

10. The method according to claim 8, wherein the brine is selected from the group consisting of ammonium chloride, potassium chloride, sodium chloride, sodium formate, potassium chloride, potassium formate, sodium bromide, calcium chloride, calcium bromide and combinations thereof.

* * * * *